United States Patent
Khlat

(10) Patent No.: US 10,879,796 B2
(45) Date of Patent: Dec. 29, 2020

(54) DC-DC CONVERTER WITH FAST VOLTAGE CHARGING CIRCUITRY FOR WI-FI CELLULAR APPLICATIONS

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/787,706

(22) Filed: Feb. 11, 2020

(65) Prior Publication Data

US 2020/0304021 A1  Sep. 24, 2020

Related U.S. Application Data

(62) Division of application No. 16/448,762, filed on Jun. 21, 2019, now Pat. No. 10,615,687.

(Continued)

(51) Int. Cl.
| | |
|---|---|
| *H04B 1/04* | (2006.01) |
| *H03F 3/19* | (2006.01) |
| *G05F 1/00* | (2006.01) |
| *H03F 1/02* | (2006.01) |
| *H02M 3/07* | (2006.01) |

(Continued)

(52) U.S. Cl.
CPC .............. *H02M 3/07* (2013.01); *H02M 1/08* (2013.01); *H04B 1/40* (2013.01); *H02M 2001/0045* (2013.01); *H04B 1/0007* (2013.01)

(58) Field of Classification Search
CPC .. G05F 1/00; G05F 1/46; H02M 1/14; H02M 1/00; H02M 3/07; H02M 1/08; H02M 2001/0045; H03F 1/02; H03F 1/26; H03F 3/24; H03F 3/19; H04B 15/00; H04B 1/04; H04B 1/40; H04B 1/0007
See application file for complete search history.

(56) References Cited

U.S. PATENT DOCUMENTS 6,160,432 A * 12/2000 Rhee ...................... H03L 7/0895
307/110
6,819,197 B2 * 11/2004 Maldonado ........... H03L 7/0898
331/17

(Continued)

OTHER PUBLICATIONS

Notice of Allowance for U.S. Appl. No. 16/448,762, dated Nov. 27, 2019, 8 pages.

*Primary Examiner* — Pablo N Tran
(74) *Attorney, Agent, or Firm* — Withrow & Terranova, P.L.L.C.

(57) ABSTRACT

The present disclosure relates to a direct current (DC)-DC converter associated with a radio frequency transceiver, which includes a transceiver capacitor. The disclosed DC-DC converter includes a battery terminal configured to provide a battery voltage, a charge pump coupled to the battery terminal and configured to provide a boosted voltage based on the battery voltage, a power inductor is coupled between the charge pump and the transceiver capacitor, and fast voltage charging circuitry with a fast-path block that is coupled between the charge pump and the transceiver capacitor. Herein, the transceiver capacitor is capable to be charged with the boosted voltage through the power inductor. The fast-path block is parallel with the power inductor and configured to provide an extra charging path to the transceiver capacitor, so as to accelerate a charging speed of the transceiver capacitor.

11 Claims, 4 Drawing Sheets

Related U.S. Application Data

(60) Provisional application No. 62/820,525, filed on Mar. 19, 2019.

(51) Int. Cl.
*H04B 1/40* (2015.01)
*H02M 1/08* (2006.01)
*H02M 1/00* (2006.01)
*H04B 1/00* (2006.01)

(56) References Cited

U.S. PATENT DOCUMENTS

| | | | | |
|---|---|---|---|---|
| 6,985,708 B2 * | 1/2006 | Lin | ............... | H03L 7/0891 |
| | | | | 375/376 |
| 7,855,535 B2 | 12/2010 | Tiew et al. | | |
| 7,884,655 B2 * | 2/2011 | Marton | ............... | H03L 7/18 |
| | | | | 327/156 |
| 7,952,424 B2 * | 5/2011 | Sanduleanu | ........ | H03L 7/0896 |
| | | | | 327/536 |
| 8,427,205 B1 * | 4/2013 | Nagaraj | ............ | H03L 7/0814 |
| | | | | 327/105 |
| 8,564,985 B2 | 10/2013 | van Straaten | | |
| 9,069,365 B2 | 6/2015 | Brown et al. | | |
| 9,256,234 B2 | 2/2016 | Kay et al. | | |
| 9,280,163 B2 | 3/2016 | Kay et al. | | |
| 9,484,809 B2 * | 11/2016 | Floyd | ............... | G11C 5/145 |
| 9,553,567 B2 * | 1/2017 | Kadam | ............... | H02M 3/07 |
| 9,653,944 B2 | 5/2017 | Teggatz et al. | | |
| 9,729,048 B2 * | 8/2017 | Crandall | ............ | H02M 3/07 |
| 9,866,178 B2 | 1/2018 | Anderson | | |
| 10,090,809 B1 | 10/2018 | Khlat | | |
| 10,177,602 B2 * | 1/2019 | Akram | ............... | H02M 3/156 |
| 10,277,072 B2 * | 4/2019 | Yen | ............... | H02J 7/025 |
| 10,404,086 B2 * | 9/2019 | Wu | ............... | H02J 7/022 |
| 10,404,175 B2 | 9/2019 | Chakraborty et al. | | |
| 10,439,624 B2 * | 10/2019 | Schober | ............... | H03L 7/04 |
| 10,680,524 B2 * | 6/2020 | Chen | ............... | H02M 1/36 |
| 10,707,840 B2 * | 7/2020 | Bodano | ............... | H02M 3/07 |
| 2015/0372592 A1 * | 12/2015 | Floyd | ............... | H02M 3/07 |
| | | | | 327/536 |
| 2017/0255250 A1 | 9/2017 | Ngo et al. | | |
| 2019/0115829 A1 * | 4/2019 | Oporta | ............... | H02J 7/022 |
| 2019/0190284 A1 * | 6/2019 | Pinto | ............... | H02J 7/0029 |
| 2019/0207505 A1 | 7/2019 | Ramadass et al. | | |
| 2019/0280590 A1 | 9/2019 | Lee et al. | | |
| 2019/0386481 A1 * | 12/2019 | Cho | ............... | H02H 7/1213 |
| 2020/0014294 A1 * | 1/2020 | Song | ............... | H02J 7/00 |
| 2020/0144913 A1 * | 5/2020 | Harjani | ............... | G05F 1/575 |

\* cited by examiner

DC-DC CONVERTER WITH FAST VOLTAGE CHARGING CIRCUITRY FOR WI-FI CELLULAR APPLICATIONS

RELATED APPLICATIONS

This application is a divisional application of U.S. patent application Ser. No. 16/448,762, filed Jun. 21, 2019, now U.S. Pat. No. 10,615,687, which claims the benefit of provisional patent application Ser. No. 62/820,525, filed Mar. 19, 2019, the disclosures of which are hereby incorporated herein by reference in their entireties.

FIELD OF THE DISCLOSURE

The present disclosure relates to a direct current (DC)-DC converter associated with a Wi-Fi cellular application, and more particularly to a DC-DC converter with fast voltage charging circuitry for the Wi-Fi cellular application.

BACKGROUND

A direct current (DC)-DC converter is a power converter that converts a source of DC from one voltage level to another. There are various types of DC-DC converters including buck, boost, or buck/boost converters. The buck and boost converters develop decreased and increased output voltages relative to an input voltage, respectively. The buck/boost converter may function as either a buck or a boost converter.

Electronic devices and systems often request conversion of an input voltage to an output voltage, which may be higher or lower than or approximately the same as the input voltage. For Wi-Fi cellular applications, a power source voltage, such as a battery voltage, is normally required to convert to a supply voltage, which is optimized to a power amplifier (PA) of a transmitter. If Wi-Fi transmission operates at a high frequency (like 5 GHz) and requires high efficiency, the PA typically needs a relatively high supply voltage. Therefore, a DC-DC converter may be used to boost a relatively low battery voltage (like 3.2V) to a relatively high supply voltage (like 5.5V) for the PA.

However, in applications having high efficiency and high frequency requirements, it is challenging to convert voltage from a low battery level to a high supply level in a short period of time (less than 2.5 µs), because of a relatively large power inductor and a relatively large transceiver capacitor associated with the PA. Accordingly, it is an object of the present disclosure to design an improved DC-DC converter, which increases the voltage charging speed so as to quickly convert voltage from the low battery level to the high supply level.

SUMMARY

The present disclosure relates to a direct current (DC)-DC converter associated with a radio frequency (RF) transceiver, which includes a transceiver capacitor. The disclosed DC-DC converter includes a battery terminal configured to provide a battery voltage, a charge pump, a power inductor, and fast voltage charging circuitry with a fast-path block. The charge pump is coupled to the battery terminal, and configured to provide a boosted voltage that is based on the battery voltage and has a higher value than the battery voltage. The power inductor is coupled between the charge pump and a terminal of the transceiver capacitor within the RF transceiver, and the transceiver capacitor is capable of being charged with the boosted voltage through the power inductor. The fast-path block of the fast voltage charging circuitry is coupled between the charge pump and the terminal of the transceiver capacitor within the RF transceiver. Herein, the fast-path block is parallel with the power inductor and configured to provide an extra charging path to the transceiver capacitor, so as to accelerate a charging speed of the transceiver capacitor.

In one embodiment of the DC-DC converter associated with the RF transceiver, the fast-path block includes one or more switches coupled in series between the charge pump and the terminal of the transceiver capacitor within the RF transceiver. Herein, each of the one or more switches is implemented by a P-type field-effect transistor (PFET).

In one embodiment of the DC-DC converter associated with the RF transceiver, the fast-path block includes one or more current sources coupled in series between the charge pump and the terminal of the transceiver capacitor within the RF transceiver. Herein, each of the one or more current sources is implemented by a PFET.

In one embodiment of the DC-DC converter associated with the RF transceiver, the boosted voltage is two times the battery voltage.

In one embodiment of the DC-DC converter associated with the RF transceiver, the fast voltage charging circuitry further includes a path controller and a voltage comparator. Herein, the fast-path block is controlled by the path controller and the voltage comparator. The voltage comparator is configured to compare a voltage at the terminal of the transceiver capacitor with a target voltage level required for the transceiver capacitor. The path controller is configured to conduct or shut off the fast-path block based on the comparison result from the voltage comparator.

In one embodiment of the DC-DC converter associated with the RF transceiver, the transceiver capacitor is charged through the power inductor until the voltage at the terminal of the transceiver capacitor reaches the target voltage level, while the transceiver capacitor is charged through the fast-path block before the voltage at the terminal of the transceiver capacitor reaches the target voltage level.

In one embodiment of the DC-DC converter associated with the RF transceiver, the transceiver capacitor is charged through the fast-path block until the voltage at the terminal of the transceiver capacitor reaches a voltage level, which equals the target voltage level minus an offset voltage level. The offset voltage level is between 0.1 V and 0.5 V.

In one embodiment of the DC-DC converter associated with the RF transceiver, a charging slope of the transceiver capacitor from a starting voltage level of the voltage to the target voltage level includes a first slope section and a second slope section. The first slope section is steeper than the second slope section.

In one embodiment of the DC-DC converter associated with the RF transceiver, the path controller is further configured to control the charge pump to be boosted by a control signal based on the comparison result from the voltage comparator.

In one embodiment of the DC-DC converter associated with the RF transceiver, the fast voltage charging circuitry is enabled if a voltage transition at the terminal of the transceiver capacitor exceeds a certain percentage of the battery voltage. Herein, the certain percentage is at least 20%.

In one embodiment of the DC-DC converter associated with the RF transceiver, the fast voltage charging circuitry is enabled when the target voltage level required for the transceiver capacitor is at least 1.2 times the battery voltage.

In one embodiment of the DC-DC converter associated with the RF transceiver, the DC-DC converter further includes a digital-to-analog converter (DAC). The target voltage level is provided by the DAC.

In one embodiment of the DC-DC converter associated with the RF transceiver, the DC-DC converter further includes a pulse-width modulation (PWM) controller, which receives the target voltage level from the DAC and the voltage at the terminal of the transceiver capacitor as inputs, and is configured to enable or disable the charge pump.

In one embodiment of the DC-DC converter associated with the RF transceiver, the DC-DC converter further comprises a PWM controller, which provides a first control signal to the charge pump. The path controller of the fast voltage charging circuitry provides a second control signal to the charge pump. Herein, at least one of the first control signal and the second control signal is high, the charge pump is configured to be boosted.

In one embodiment of the DC-DC converter associated with the RF transceiver, the power inductor is coupled to the charge pump at an interior node. The DC-DC converter further includes a first switch structure and a second switch structure. Herein, the first switch structure is coupled between the battery terminal and the interior node, and the second switch structure is coupled between the interior node and ground.

In one embodiment of the DC-DC converter associated with the RF transceiver, the first switch structure includes one or more switches stacked in series between the battery terminal and the interior node, and the second switch structure includes one or more switches stacked in series between the interior node and ground.

In one embodiment of the DC-DC converter associated with the RF transceiver, the DC-DC converter further includes a PWM controller, which is configured to enable or disable the charge pump, the first switch structure, and the second switch structure.

According to another embodiment, a multi-output DC-DC conversion structure associated with a first RF transceiver and a second RF transceiver is disclosed. The first RF transceiver has a first transceiver capacitor and the second RF transceiver has a second transceiver capacitor. The multi-output DC-DC conversion structure includes a first DC-DC converter and a second DC-DC converter. Herein, the first DC-DC converter includes a first battery terminal, a first charge pump, a first power inductor, and first fast voltage charging circuitry, while the second DC-DC converter includes a second battery terminal, a second charge pump, a second power inductor, and second fast voltage charging circuitry. The first battery terminal and the second battery terminal are connected and configured to provide a battery voltage. The first charge pump is coupled to the first battery terminal and configured to provide a first boosted voltage based on the battery voltage, and the second charge pump is coupled to the second battery terminal and configured to provide a second boosted voltage based on the battery voltage. The first boosted voltage and the second boosted voltage are higher than the battery voltage. The first power inductor is coupled between the first charge pump and a terminal of the first transceiver capacitor, while the second power inductor is coupled between the second charge pump and a terminal of the second transceiver capacitor. The first transceiver capacitor is capable of being charged with the first boosted voltage through the first power inductor, and the second transceiver capacitor is capable of being charged with the second boosted voltage through the second power inductor. The first fast voltage charging circuitry has a first fast-path block that is coupled between the first charge pump and the terminal of the first transceiver capacitor, such that the first fast-path block is parallel with the first power inductor and configured to provide an extra charging path to the first transceiver capacitor. The second fast voltage charging circuitry has a second fast-path block that is coupled between the second charge pump and the terminal of the second transceiver capacitor, such that the second fast-path block is parallel with the second power inductor and configured to provide an extra charging path to the second transceiver capacitor. The first fast-path block is configured to accelerate a charging speed of the first transceiver capacitor, and the second fast-path block is configured to accelerate a charging speed of the second transceiver capacitor.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1A:
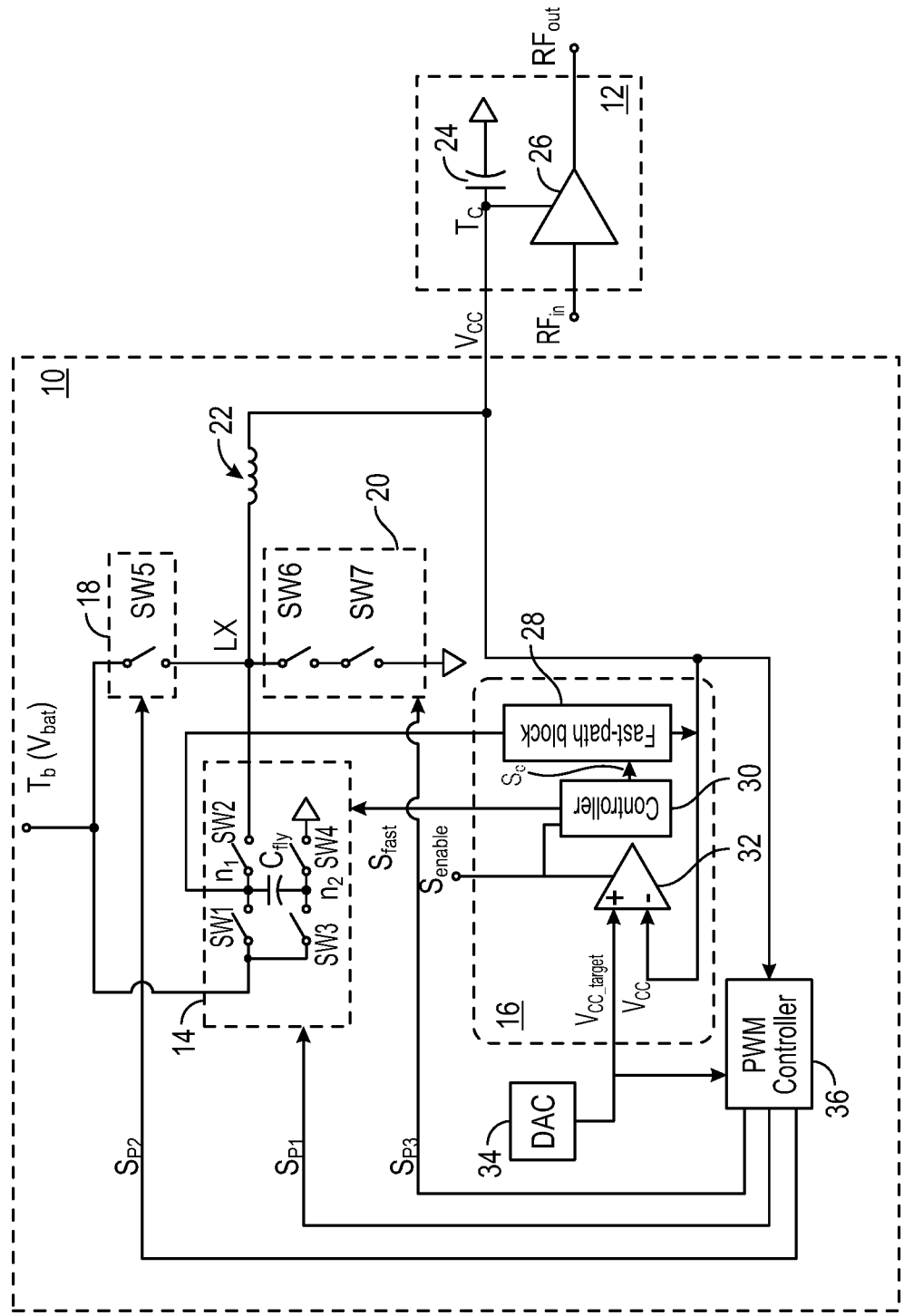
FIG. 1A-1C shows a direct current (DC)-DC converter with fast voltage charging circuitry according to one embodiment of the present disclosure.

It will be understood that for clear illustrations, FIGS. 1A-3 may not be drawn to scale.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to a direct current (DC)-DC converter, with fast voltage charging circuitry for Wi-Fi cellular applications. FIG. 1 shows an exemplary DC-DC converter 10, which is able to boost a voltage $V_{cc}$ applied to a radio frequency (RF) transceiver 12 (from a low voltage level to a high voltage level) in a short period of time, such as less than 2.5 µs. The DC-DC converter 10 includes a charge pump 14, fast voltage charging circuitry 16, a first switch structure 18, a second switch structure 20, and a power inductor 22. In addition, the RF transceiver 12 at least includes a transceiver capacitor 24 and a power amplifier 26, which utilizes the voltage $V_{cc}$ as a power supply, and is configured to amplify an RF input signal $RF_{in}$ to an RF output signal $RF_{out}$. Other electronic components within the RF transceiver 12 are not shown for simplicity.

Herein, the charge pump 14, the first switch structure 18, and the second switch structure 20 are all coupled to a same interior node LX. The charge pump 14 is coupled between a battery terminal Tb with a voltage level $V_{bat}$ and the interior node LX, and configured to provide a boosted voltage $V_{boost}$, e.g. $2*V_{bat}$, at the interior node LX. With a different structure/configuration, the boosted voltage $V_{boost}$ provided by the charge pump 14 may have a different scale factor compared to $V_{bat}$. The first switch structure 18 is coupled between the battery terminal Tb and the interior node LX, and configured to provide $V_{bat}$ at the LX node. The second switch structure 20 is coupled between the interior node LX and ground, and configured to provide zero voltage at the interior node LX. There may be only one of the charge pump 14, the first switch structure 18, and the second switch structure 20 conducted at one time.

Further, the interior node LX is coupled to a capacitor terminal Tc of the transceiver capacitor 24 within the RF transceiver 12 via the power inductor 22. As such, the voltage $V_{cc}$ applied to the RF transceiver 12 may range between 0 and $V_{boost}$ ($2*V_{bat}$) and the transceiver capacitor 24 may be charged up to $V_{boost}$ ($2*V_{bat}$) or discharged to ground. The power amplifier 26 is coupled to the capacitor terminal Tc and utilizes the voltage $V_{cc}$ as a power supply. In applications having high efficiency and high frequency requirements, it may take a relatively long time to charge or discharge the transceiver capacitor 24. It is because the power inductor 22 and the transceiver capacitor 24 associated with the power amplifier 26 have relatively large values, such as 2.2 µH and 2.2 µF, respectively.

In details, the charge pump 14 includes four pump switches SW1-SW4 and a flying capacitor $C_{fly}$. A first pump switch SW1 is coupled between the battery terminal Tb and a second pump switch SW2, and the second pump switch SW2 is coupled between the first pump switch SW1 and the interior node LX. A third pump switch SW3 is coupled between the battery terminal Tb and a fourth pump switch SW4, and the fourth pump switch SW4 is coupled between the third pump switch SW3 and ground. The flying capacitor $C_{fly}$ is coupled between a first connecting node $n_1$ (between the first pump switch SW1 and the second pump switch SW2) and a second connecting node $n_2$ (between the third pump switch SW3 and the fourth pump switch SW4). When the first pump switch SW1 and the fourth pump switch SW4 are closed, and the second pump switch SW2 and the third pump switch SW 3 are open, the flying capacitor $C_{fly}$ is charged up to $V_{bat}$. As such, the voltage level at the first connecting node n1 is $V_{bat}$, while the voltage level at the second connecting node n2 is zero. When the first pump switch SW1 and the fourth pump switch SW4 turn to open and the second pump switch SW2 and the third pump switch SW3 turn to close, the voltage level at the second connecting node n2 will change to $V_{bat}$ and the first connecting node n1 will be boosted to $2*V_{bat}$. This is because the voltage difference across the flying capacitor $C_{fly}$ (between the first and second connecting nodes n1 and n2) cannot change instantly. Once the voltage level at the second connecting node n2 changes to $V_{bat}$, the first connecting node n1 is boosted to $2*V_{bat}$ to keep the voltage difference across the flying capacitor $C_{fly}$. Herein, the flying capacitor $C_{fly}$ may have a capacitance (such as 4.7 µF) at least twice the transceiver capacitor 24. In this configuration (the first pump switch SW1 and the fourth pump switch SW4 are open and the second pump switch SW2 and the third pump switch SW3 are closed), the first connecting node n1 is directly connected to the interior node LX, such that the interior node LX will have a voltage level at $2*V_{bat}$. When the charge pump 14 is active, the first switch structure 18 and the second switch structure 20 may not be conducted. In one embodiment, each switch SW1/SW2/SW3/SW4 within the charge pump 14 may be implemented by a field-effect transistor (FET). The switches SW1, SW2, and SW3 may be p-type FETs (PFET), while the switch SW4 may be a n-type FET (NFET).

The first switch structure 18 may include one switch SW5 coupled between the battery terminal Tb and the interior node LX. When the first switch structure 18 is conducted (the switch SW5 is closed) and the second switch structure 20 and the charge pump 14 are not conducted, the voltage level at the interior node LX is set to $V_{bat}$. Herein, if a voltage endurance of the switch SW5 is smaller than $V_{bat}$, the first switch structure 18 may need to include two or more switches stacked in series between the battery terminal Tb and the interior node LX.

In addition, the second switch structure 20 may include one or more switches SW6 and SW7 stacked in series between the interior node LX and ground. When the second switch structure 20 is conducted (the switches SW6 and SW7 are closed), the first switch structure 18 and the charge pump 14 are not conducted. And the voltage level at the interior node LX is set to zero. Herein, if a voltage endurance of one switch SW6 or SW7 is smaller than $V_{boost}$ ($2*V_{bat}$), the second switch structure 20 may need to include two or more switches stacked in series to conduct the interior node LX to ground. In one embodiment, each switch SW5/SW6/SW7 within the first or second switch structure 18/20 may be implemented by a FET. The switch SW5 may be a PFET, while the switches SW6 and SW7 may be NFETs.

Figure 1B:
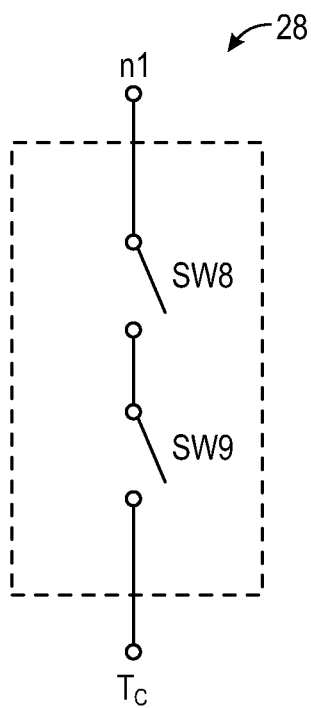
Figure 1C:
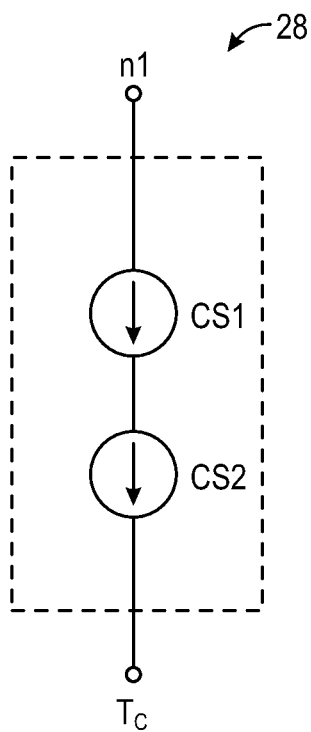

In order to accelerate the charging speed of the transceiver capacitor 24 and transit the voltage $V_{cc}$ from a low start voltage level $V_{cc\_start}$ to a high target voltage level $V_{cc\_target}$ in a short period (less than 2.5 μs), the DC-DC converter 10 further includes the fast voltage charging circuitry 16, which includes a fast-path block 28, a path controller 30, and a voltage comparator 32. In detail, the fast-path block 28 is coupled between the first connecting node n1 of the charge pump 14 and the capacitor terminal Tc of the transceiver capacitor 24 (parallel with the power inductor 22), so as to provide an extra charging path from the charge pump 14 to the transceiver capacitor 24 and avoid the power inductor 22. The fast-path block 28 may include one or more switches SW8 and SW9 stacked in series, as shown in FIG. 1B, or may include one or more current sources CS1 and CS2 stacked in series, as shown in FIG. 1C. In one embodiment, each switch SW8/SW9 or each current source CS1/CS2 within the fast-path block 28 may be implemented by a PFET. Herein, if a voltage endurance of one PFET is smaller than $V_{boost}$ ($2*V_{bat}$), the fast-path block 28 may need to include two or more switches/current sources stacked in series between the first connecting node n1 and the capacitor terminal Tc of the transceiver capacitor 24.

It is clear that the extra charging path provided by the fast-path block 28 from the charge pump 14 to the transceiver capacitor 24 does not include any power inductor. Therefore, when the fast-path block 28 is conducted, the transceiver capacitor 24 will be charged more quickly compared to the transceiver capacitor 24 charged through the power inductor 22 alone. Note that, when the transceiver capacitor 24 is charged through the fast-path block 28, the transceiver capacitor 24 may also be charged through the power inductor 22 (more details are described later).

Within the fast voltage charging circuitry 16, the fast-path block 28 is controlled by the path controller 30 and the voltage comparator 32. The voltage comparator 32 compares the voltage $V_{cc}$ at the transceiver capacitor 24 with the target voltage level $V_{cc\_target}$ desired for the transceiver capacitor 24. Based on the comparison result from the voltage comparator 32, the path controller 30 is configured to provide a control signal $S_c$ to the fast-path block 28. When the fast-path block 28 includes the switches SW8 and SW9, the control signal $S_c$ is a digital signal to open or close the switches SW8 and SW9. When the fast-path block 28 includes the current source CS1 and CS2, the control signal $S_c$ is an analog signal to control the current volume through the current source CS1 and CS2. The path controller 30 may further control the charge pump 14 by a control signal $S_{fast}$ based on the comparison result from the voltage comparator 32 (more details are described later). Herein, the fast voltage charging circuitry 16 (the path controller 30 and the voltage comparator 32) may be enabled by an enable signal $S_{enable}$ for a short duration to ensure the voltage $V_{cc}$ at the transceiver capacitor 24 transiting from the start voltage level $V_{cc\_start}$ (low) to the target voltage level $V_{cc\_target}$ (high). In addition, the enable signal $S_{enable}$ is active for a certain range of the battery voltage level $V_{bat}$, or when the voltage increase at the transceiver capacitor 24 exceeds a certain percentage of the battery voltage level $V_{bat}$.

For instance, if the battery voltage level $V_{bat}$ is comparable to the target voltage level $V_{cc\_target}$ of the transceiver capacitor 24 (like 5V vs. 5.5V), it may not be necessary to conduct the fast-path block 28. It is because the voltage level at the interior node LX may reach $2*V_{bat}$, which may be much higher than the target voltage level $V_{cc\_target}$ and may bring about a fast voltage transition even through the power inductor 22. For another instance, if a change of the voltage $V_{cc}$ at the transceiver capacitor 24 from the start voltage level $V_{cc\_start}$ (low) to the target voltage level $V_{cc\_target}$ (high) is only 10% of the battery voltage level $V_{bat}$ (like $V_{cc\_target} - V_{cc\_start} = 0.5V = 10\% \, V_{bat}$), it may not be necessary to conduct the fast-path block 28. It is because a small change of the voltage $V_{cc}$ at the transceiver capacitor 24 only requires a small amount of charge quantity, which may be quickly achieved even through the power inductor 22. Herein, the fast voltage charging circuitry 16 may be enabled, when the target voltage level $V_{cc\_target}$ is at least 1.2 times the battery voltage level $V_{bat}$, and/or the certain percentage of comparing the voltage transition at the transceiver capacitor 24 to the battery voltage level $V_{bat}$ is at least 20%.

In one embodiment, the target voltage level $V_{cc\_target}$ may be provided by a digital-to-analog converter (DAC) 34. In addition, the DC-DC converter 10 may further include a pulse-width modulation (PWM) controller 36, which receives the target voltage level $V_{cc\_target}$ level from the DAC 34 and the voltage $V_{cc}$ at the capacitor terminal Tc of the transceiver capacitor 24 as inputs, and is configured to enable/disable the charge pump 14, the first switch structure 18, and the second switch structure 20 via a first PWM signal $S_{p1}$, a second PWM signal $S_{p2}$, and a third PWM signal $S_{p3}$, respectively.

Note that both the path controller 30 within the fast voltage charging circuitry 16 and the PWM controller 36 provide the control signals $S_{p1}$ and $S_{fast}$, respectively, to the charge pump 14. When the first PWM signal $S_{p1}$ and the control signal $S_{fast}$ are both low, the switches SW1 and SW4 are closed and the switches SW2 and SW3 are open. The flying capacitor $C_{fly}$ is configured to be charged to $V_{bat}$. When at least one of the first PWM signal $S_{p1}$ and the control signal $S_{fast}$ is high, the switches SW1 and SW4 are open and the switches SW2 and SW3 are closed. The first connecting node n1 of the flying capacitor $C_{fly}$ is then connected to the interior node LX, and boosted to $V_{boost}$ ($2*V_{bat}$). In addition, when the second PWM signal $S_{p2}$ is low, the first switch structure 18 is disabled, and when the second PWM signal $S_{p2}$ is high, the first switch structure 18 is conducted (the interior node LX has a voltage level at Vbat). When the third PWM signal $S_{p2}$ is low, the second switch structure 20 is disabled, and when the second PWM signal $S_{p2}$ is high, the second switch structure 20 is conducted (the interior node LX is grounded).

Figure 2:
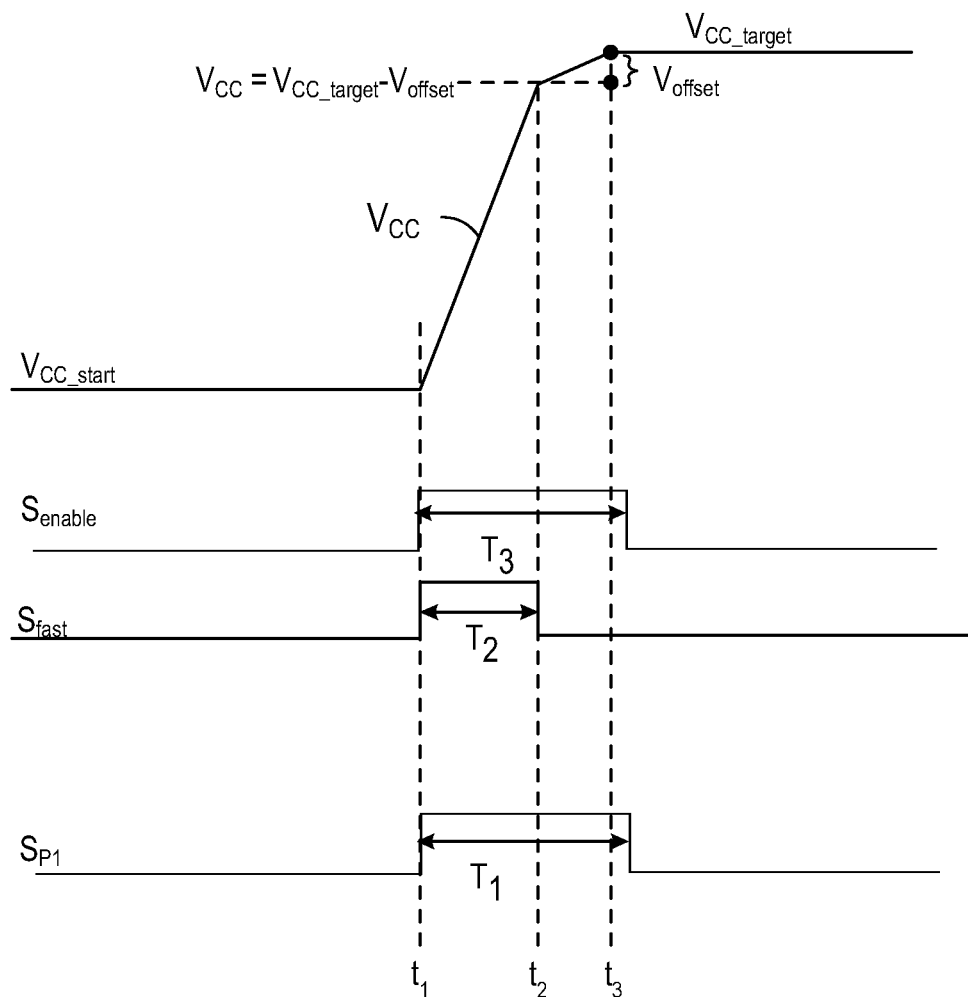
FIG. 2 shows timing diagrams of the DC-DC converter shown in FIG. 1.

FIG. 2 shows timing diagrams of the DC-DC converter 10 shown in FIG. 1. When the first PWM signal $S_{p1}$ from the PWM controller 36 becomes high at $t_1$, the first pump switch SW1 and the fourth pump switch SW4 will be open, and the second pump switch SW2 and the third pump switch SW3 will be closed. The voltage level at the first connecting node n1 is boosted to $2*V_{bat}$. From $t_1$, the fast voltage charging circuitry 16 is enabled by the enable signal $S_{enable}$, and the $S_{fast}$ signal from the path controller 30 of the fast voltage charging circuitry 16 is active. Therefore, the charge pump 14 is connected with the fast voltage charging circuitry 16, and the fast-path block 28 is conducted. The transceiver capacitor 24 starts to be charged with $2*V_{bat}$ at the first connecting node n1 through the fast-path block 28. The voltage $V_{cc}$ at the terminal Tc of the transceiver capacitor 24 increases. At the same time (start from $t_1$), the first connecting node n1 remains connected to the interior node LX, such that the transceiver capacitor 24 is also charged with $2*V_{bat}$ at the first connecting node n1 through the power inductor 22.

To prevent overcharge of the transceiver capacitor 24, the fast voltage charging circuitry 16 may be disconnected from the charge pump 14 and/or the fast-path block 28 may be shut off before the voltage $V_{cc}$ at the terminal Tc of the transceiver capacitor 24 reaches the target voltage level $V_{cc\_target}$. When the difference between the target voltage level $V_{cc\_target}$ and the current voltage level $V_{cc}$ decreases to a small offset voltage value $V_{offset}$ (between 0.1 V and 0.5 V) at $t_2$, the fast voltage charging circuitry 16 may be disconnected from the charge pump 14 and/or the fast-path block 28 may be shut off. The $S_{fast}$ signal is no longer active after $t_2$, and the transceiver capacitor 24 will be no longer be charged through the fast-path block 28 (even though the enable signal $S_{enable}$ of the fast voltage charging circuitry 16 is still active). After $t_2$, the transceiver capacitor 24 is still charged through the power inductor 22 until the voltage level $V_{cc}$ at the terminal Tc of the transceiver capacitor 24 reaches the target voltage level $V_{cc\_target}$ at $t_3$. The enable signal $S_{enable}$ and the first PWM signal $S_{p1}$ from the PWM controller 36 may keep high for a short duration after $t_3$.

Note that a charging slope between $t_1$ and $t_2$ (from $V_{cc\_start}$ to $V_{cc\_target}-V_{offset}$) is much steeper than a charging slope between $t_2$ and $t_3$ (from $V_{cc\_target}-V_{offset}$ to $V_{cc\_target}$). This is because the transceiver capacitor 24 is charged through both the power inductor 22 and the fast-path block 28 between $t_1$ and $t_2$, while the transceiver capacitor 24 is charged only through the power inductor 22 between $t_2$ and $t_3$. Further, because there is no power inductor within the fast-path block 28, the transceiver capacitor 24 is charged faster through the fast-path block 28 than through the power inductor 22.

Figure 3:
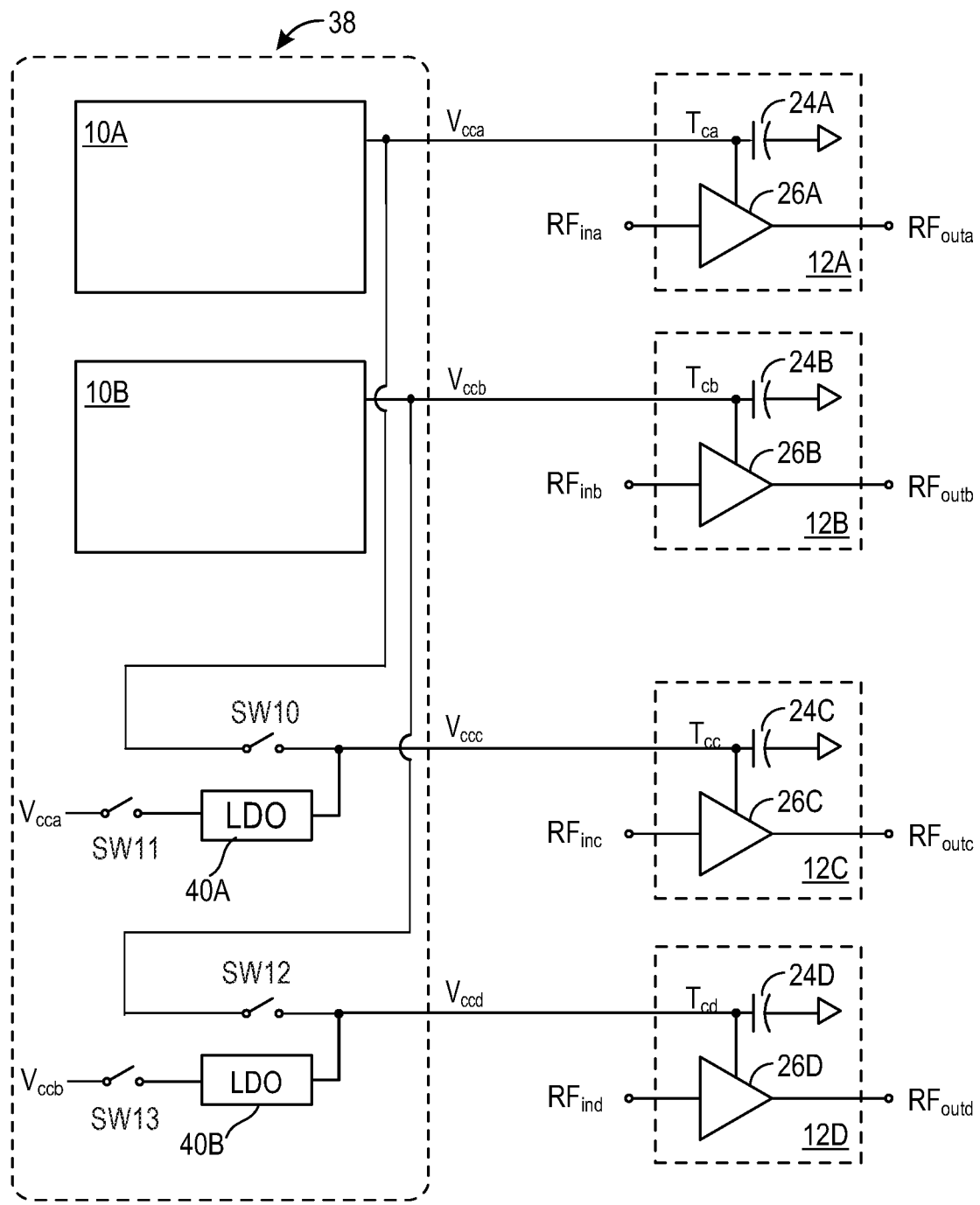
FIG. 3 shows a multi-output DC-DC converter for Wi-Fi cellular applications according to one embodiment of the present disclosure.

FIG. 3 shows a multi-output DC-DC conversion structure 38 for Wi-Fi cellular applications according to one embodiment of the present disclosure. For the purpose of this illustration, the multi-output DC-DC conversion structure 38 has four outputs and is configured to boost or buck voltages $V_{cca}$, $V_{ccb}$, $V_{ccc}$, and $V_{ccd}$ at a first RF transceiver 12A, a second RF transceiver 12B, a third RF transceiver 12C, and a fourth RF transceiver 12D, respectively. In different applications, the multi-output DC-DC conversion structure 38 may have fewer or more outputs and be connected to fewer or more RF transceivers. Each of the first, second, third and fourth RF transceivers 12A, 12B, 12C, and 12D may have a same structure as the RF transceiver 12 shown in FIG. 1. Specifically, the first RF transceiver 12A includes at least a first transceiver capacitor 24A and a first power amplifier 26A, which utilizes the first voltage $V_{cca}$ as a power supply, and is configured to amplify an RF input signal $RF_{ina}$ to an RF output signal $RF_{outa}$. The first RF transceiver 12A is coupled to the multi-output DC-DC conversion structure 38 at a capacitor terminal $T_{ca}$ of the first transceiver capacitor 24A. The second RF transceiver 12B includes at least a second transceiver capacitor 24B and a second power amplifier 26B, which utilizes the second voltage $V_{ccb}$ as a power supply, and is configured to amplify an RF input signal $RF_{inb}$ to an RF output signal $RF_{outb}$. The second RF transceiver 12B is coupled to the multi-output DC-DC conversion structure 38 at a capacitor terminal $T_{cb}$ of the second transceiver capacitor 24B. The third RF transceiver 12C includes at least a third transceiver capacitor 24C and a third power amplifier 26C, which utilizes the third voltage $V_{ccc}$ as a power supply, and is configured to amplify an RF input signal $RF_{inc}$ to an RF output signal $RF_{outc}$. The third RF transceiver 12C is coupled to the multi-output DC-DC conversion structure 38 at a capacitor terminal $T_{cc}$ of the third transceiver capacitor 24C. The fourth RF transceiver 12D includes at least a fourth transceiver capacitor 24D and a fourth power amplifier 26D, which utilizes the fourth voltage $V_{ccd}$ as a power supply, and is configured to amplify an RF input signal $RF_{ind}$ to an RF output signal $RF_{outd}$. The fourth RF transceiver 12D is coupled to the multi-output DC-DC conversion structure 38 at a capacitor terminal $T_{cd}$ of the fourth transceiver capacitor 24D. The first, second, third, and fourth RF transceivers 12A, 12B, 12C, and 12D may have same or different desired target voltage levels $V_{cca\_target}$, $V_{ccb\_target}$, $V_{ccc\_target}$, and $V_{ccd\_target}$, respectively. For instance, the first and second RF transceivers 12A and 12B that may operate around a relatively high frequency, like 5 GHz, require higher target voltage levels than the third and fourth RF transceivers 12C and 12D that may operate around a relatively low frequency, like 2.2 GHz. Further, even though the first and second RF transceivers 12A and 12B may operate at a same frequency, the first and second RF transceivers 12A and 12B may have different target voltage levels.

The multi-output DC-DC conversion structure 38 includes a first DC-DC converter 10A, a second DC-DC converter 10B, a first low dropout circuit (LDO) 40A, a second LDO 40B, and four switches SW10-SW13. The switch SW10 is coupled between the first DC-DC converter 10A and the third RF transceiver 12C. The switch SW11 and the first LDO 40A are coupled in series between the capacitor terminal $T_{ca}$ of the first transceiver capacitor 24A and the capacitor terminal $T_{cc}$ of the third transceiver capacitor 24C. The switch SW12 is coupled between the second DC-DC converter 10B and the fourth RF transceiver 12D. The switch SW13 and the second LDO 40B are coupled in series between the capacitor terminal $T_{cb}$ of the second transceiver capacitor 24B and the capacitor terminal $T_{cd}$ of the fourth transceiver capacitor 24D.

Herein, the first DC-DC converter 10A and the second DC-DC converter 10B have a same structure as the DC-DC converter 10 (see FIG. 1 for details). A first battery terminal of the first DC-DC converter 10A and a second battery terminal of the second DC-DC converter 10B may be connected and configured to provide a same battery voltage $V_{bat}$ (not shown). The first DC-DC converter 10A is able to boost the first voltage $V_{cca}$ at the capacitor terminal $T_{ca}$ of the first transceiver capacitor 24A from a start voltage level $V_{cca\_start}$ (low) to the target voltage level $V_{cca\_target}$ (high) in a short period (less than 2.5 μs), and/or is able to boost the third voltage $V_{ccc}$ at the capacitor terminal $T_{cc}$ of the third transceiver capacitor 24C from a start voltage level $V_{ccc\_start}$ (low) to the target voltage level $V_{ccc\_target}$ (high) in a short period (less than 2.5 µs). When the first RF transceiver 12A operates but the third RF transceiver 12C does not operate, both switches S10 and S11 may be open. When the third RF transceiver 12C operates but the first RF transceiver 12A does not operate, the switch S10 is closed and the switch S11 is open. Herein, the first DC-DC converter 10A is directly coupled to the third RF transceiver 12C. Further, if the third RF transceiver 12C has a lower operating frequency than the first RF transceiver 12A, the third RF transceiver 12C may require lower target voltage levels $V_{ccc\_target}$ than the first target voltage level $V_{cca\_target}$ of the first RF transceiver 12A. When the first RF transceiver 12A and the third RF transceiver 12C operate at a same time, the switch S10 is open and the switch S11 is closed. The first LDO 40A is configured to regulate the first voltage $V_{cca}$ applied to the first RF transceiver 12A to the third voltage $V_{ccc}$ applied to the third RF transceiver 12C (the third voltage $V_{ccc}$ may be lower than the first voltage $V_{cca}$). When the first voltage $V_{cca}$ achieve the first target voltage level $V_{cca\_target}$, the third voltage $V_{ccc}$ may achieve the third target voltage level $V_{ccc\_target}$, which is lower than the first target voltage level $V_{cca\_target}$. Herein, because the first LDO 40A does not include any power inductor, the third voltage $V_{ccc}$ may still achieve the target voltage levels very fast, e.g. less than 2.5 µs.

Similarly, the second DC-DC converter 10B is able to boost the second voltage $V_{ccb}$ at the capacitor terminal $T_{cb}$ of the second transceiver capacitor 24B from a start voltage level $V_{ccb\_start}$ (low) to the target voltage level $V_{ccb\_target}$ (high) in a short period (less than 2.5 µs), and/or is able to boost the fourth voltage $V_{ccd}$ at the capacitor terminal $T_{cd}$ of the fourth transceiver capacitor 24D from a start voltage level $V_{ccd\_start}$ (low) to the target voltage level $V_{ccd\_target}$ (high) in a short period (less than 2.5 µs). When the second RF transceiver 12B operates but the fourth RF transceiver 12D does not operate, both switches S12 and S13 may be open. When the fourth RF transceiver 12D operates but the second RF transceiver 12B does not operate, the switch S12 is closed and the switch S13 is open. Herein, the second DC-DC converter 10B is directly coupled to the fourth RF transceiver 12D. Further, if the fourth RF transceiver 12D has a lower operating frequency than the second RF transceiver 12B, the fourth RF transceiver 12D may require lower target voltage levels $V_{ccd\_target}$ than the second target voltage level $V_{ccb\_target}$ of the second RF transceiver 12B. When the second RF transceiver 12B and the fourth RF transceiver 12D operate at a same time, the switch S12 is open and the switch S13 is closed. The second LDO 40B is configured to regulate the second voltage $V_{ccb}$ applied to the second RF transceiver 12B to the fourth voltage $V_{ccd}$ applied to the fourth RF transceiver 12D (the fourth voltage $V_{ccd}$ may be lower than the second voltage $V_{ccb}$). When the second voltage $V_{ccb}$ achieve the second target voltage level $V_{ccb\_target}$, the fourth voltage $V_{ccd}$ may achieve the fourth target voltage level $V_{ccd\_target}$, which is lower than the second target voltage level $V_{ccb\_target}$. Herein, because the second LDO 40B does not include any power inductor, the fourth voltage $V_{ccd}$ may still achieve the target voltage levels very fast, e.g. less than 2.5 µs. The multi-output DC-DC conversion structure 38 is able to provide fast transitions from a low voltage level to various high voltage levels (here is up to four) for multiple RF transceivers.

Those skilled in the art will recognize improvements and modifications to the preferred embodiments of the present disclosure. All such improvements and modifications are considered within the scope of the concepts disclosed herein and the claims that follow.

What is claimed is:

1. An apparatus comprising:
   a first RF transceiver with a first transceiver capacitor;
   a second RF transceiver with a second transceiver capacitor; and
   a multi-output DC-DC conversion structure with a first DC-DC converter and a second DC-DC converter, wherein:
   the first DC-DC converter includes a first battery terminal, a first charge pump, a first power inductor, and first fast voltage charging circuitry;
   the second DC-DC converter includes a second battery terminal, a second charge pump, a second power inductor, and second fast voltage charging circuitry;
   the first battery terminal and the second battery terminal are connected and configured to provide a battery voltage;
   the first charge pump is coupled to the first battery terminal and configured to provide a first boosted voltage based on the battery voltage, and the second charge pump is coupled to the second battery terminal and configured to provide a second boosted voltage based on the battery voltage, wherein the first boosted voltage and the second boosted voltage are higher than the battery voltage;
   the first power inductor is coupled between the first charge pump and a terminal of the first transceiver capacitor, wherein the first transceiver capacitor is capable of being charged with the first boosted voltage through the first power inductor;
   the second power inductor is coupled between the second charge pump and a terminal of the second transceiver capacitor, wherein the second transceiver capacitor is capable of being charged with the second boosted voltage through the second power inductor;
   the first fast voltage charging circuitry has a first fast-path block that is coupled between the first charge pump and the terminal of the first transceiver capacitor, wherein the first fast-path block is parallel with the first power inductor and configured to provide an extra charging path to the first transceiver capacitor, so as to accelerate a charging speed of the first transceiver capacitor; and
   the second fast voltage charging circuitry has a second fast-path block that is coupled between the second charge pump and the terminal of the second transceiver capacitor, wherein the second fast-path block is parallel with the second power inductor and configured to provide an extra charging path to the second transceiver capacitor, so as to accelerate a charging speed of the second transceiver capacitor.

2. The apparatus of claim 1 further comprising a third RF transceiver with a third transceiver capacitor, wherein:
   the multi-output DC-DC conversion structure further comprises a first switch, a second switch, and a first low dropout circuit (LDO); and
   the first switch is coupled between the first DC-DC converter and a terminal of the third transceiver capacitor, while the second switch and the first LDO are coupled in series between the first DC-DC converter and the terminal of the third transceiver capacitor.

3. The apparatus of claim 2 wherein the first LDO is configured to regulate a first voltage applied to the first RF transceiver and provide a second voltage to the third RF transceiver, wherein the second voltage applied to the third RF transceiver is lower than the first voltage applied to the first RF transceiver.

4. The apparatus of claim 2 further comprising a fourth RF transceiver with a fourth transceiver capacitor, wherein:
the multi-output DC-DC conversion structure further comprises a third switch, a fourth switch, and a second LDO; and
the third switch is coupled between the second DC-DC converter and a terminal of the fourth transceiver capacitor, while the fourth switch and the second LDO are coupled in series between the second DC-DC converter and the terminal of the fourth transceiver capacitor.

5. The apparatus of claim 4 wherein:
the first LDO is configured to regulate a first voltage applied to the first RF transceiver and provide a second voltage to the third RF transceiver, wherein the second voltage applied to the third RF transceiver is lower than the first voltage applied to the first RF transceiver; and
the second LDO is configured to regulate a third voltage applied to the second RF transceiver and provide a fourth voltage to the fourth RF transceiver, wherein the fourth voltage applied to the fourth RF transceiver is lower than the third voltage applied to the second RF transceiver.

6. The apparatus of claim 1 wherein:
the first fast-path block comprises one or more first switches coupled in series between the first charge pump and the terminal of the first transceiver capacitor within the first RF transceiver; and
the second fast-path block comprises one or more second switches coupled in series between the second charge pump and the terminal of the second transceiver capacitor within the second RF transceiver.

7. The apparatus of claim 1 wherein:
the first fast-path block comprises one or more first current sources coupled in series between the first charge pump and the terminal of the first transceiver capacitor within the first RF transceiver; and
the second fast-path block comprises one or more second current sources coupled in series between the second charge pump and the terminal of the second transceiver capacitor within the second RF transceiver.

8. The apparatus of claim 1 wherein:
the first fast voltage charging circuitry further comprises a first path controller and a first voltage comparator, wherein:
the first fast-path block is controlled by the first path controller and the first voltage comparator;
the first voltage comparator is configured to compare a first voltage at the terminal of the first transceiver capacitor with a first target voltage level required for the first transceiver capacitor; and
the first path controller is configured to conduct or shut off the first fast-path block based on a comparison result from the first voltage comparator; and
the second fast voltage charging circuitry further comprises a second path controller and a second voltage comparator, wherein:
the second fast-path block is controlled by the second path controller and the second voltage comparator;
the second voltage comparator is configured to compare a second voltage at the terminal of the second transceiver capacitor with a second target voltage level required for the second transceiver capacitor; and
the second path controller is configured to conduct or shut off the second fast-path block based on the comparison result from the second voltage comparator.

9. The apparatus of claim 8 wherein:
the first path controller is further configured to control the first charge pump to be boosted by a first control signal based on the comparison result from the first voltage comparator; and
the second path controller is further configured to control the second charge pump to be boosted by a second control signal based on the comparison result from the second voltage comparator.

10. The apparatus of claim 8 wherein:
the first DC-DC converter further comprises a first digital-to-analog converter (DAC), wherein the first target voltage level is provided by the first DAC; and
the second DC-DC converter further comprises a second DAC, wherein the second target voltage level is provided by the second DAC.

11. The apparatus of claim 10 wherein:
the first DC-DC converter further comprises a first pulse-width modulation (PWM) controller, which receives the first target voltage level from the first DAC and the first voltage at the terminal of the first transceiver capacitor as inputs, and is configured to control the first charge pump to be boosted; and
the second DC-DC converter further comprises a second PWM controller, which receives the second target voltage level from the second DAC and the second voltage at the terminal of the second transceiver capacitor as inputs, and is configured to control the second charge pump to be boosted.

\* \* \* \* \*